United States Patent [19]

Pankratz

[11] 4,449,743

[45] May 22, 1984

[54] LOG HANDLING TOOL

[76] Inventor: Orlando K. Pankratz, 833 N. Vancouver, Tulsa, Okla. 74127

[21] Appl. No.: 317,137

[22] Filed: Nov. 2, 1981

[51] Int. Cl.[3] .......................... A47J 49/00; B66C 1/42

[52] U.S. Cl. .......................... 294/11; 294/103 R

[58] Field of Search .......................... 294/9–11, 294/16, 17, 19 R, 22, 50.9, 103 R, 34; 81/314, 337, 338, 357, 359; 403/105–109

[56] References Cited

U.S. PATENT DOCUMENTS

| | | | |
|---|---|---|---|
| 1,853,899 | 4/1932 | Haverstick | 294/11 |
| 2,716,912 | 9/1955 | Maitland | 81/314 |
| 3,354,755 | 11/1967 | Legrande | 81/314 |
| 4,225,170 | 9/1980 | Flynn | 294/11 |
| 4,252,357 | 2/1981 | Majors | 294/11 |
| 4,307,909 | 12/1981 | Yaworski | 294/11 |

*Primary Examiner*—Johnny D. Cherry

*Attorney, Agent, or Firm*—Head, Johnson & Stevenson

[57] ABSTRACT

A log handling tool having an elongated barrel, a shaft reciprocally disposed within the barrel and having a spring steel tine member secured to the outer ends thereof, prong members secured to the barrel for cooperating with the tine to engage the outer periphery of the log, a ratchet and spring urged pawl assembly cooperating between the shaft and barrel for securing a shaft in selected longitudinal positions within the barrel, a spring urged latch member engageable with the ratchet for selective increments of longitudinal movement of the shaft, a trigger operably connected with the latch member for actuation thereof, a release mechanism engageable with the pawl for selective releasing of the engagement thereof with the ratchet, a first handle member secured to one end of the barrel and extending outwardly therefrom at an angle, and a second handle secured to the barrel substantially centrally disposed between the opposite ends thereof for cooperating with the first handle to provide an efficient balance of the tool for facilitating handling of a log engaged by the tool.

7 Claims, 18 Drawing Figures

LOG HANDLING TOOL

CROSS-REFERENCE TO RELATED APPLICATIONS

This application is related to my Disclosure Document No. 089,217, dated Apr. 2, 1980.

BACKGROUND OF THE INVENTION

1. Field of the Invention

This invention relates to improvements in material handling apparatus and more particularly but not by way of limitation to a tool for the manipulation of logs, such as those used in a wood burning fireplace or the like.

2. Description of the Prior Art

The present day energy crisis has created an increasing interest in the use of wood, such as logs, for heating and other purposes. Of course, it is usually necessary to provide a considerable amount of personal attendance in order to maintain efficiency in the burning of wood or logs. The logs not only must be moved about the fire box or fire area as they burn in order to preclude smothering the flame or the like, but also as the wood is consumed additional logs must be added to preclude a complete extinguishing of the fire. As a log is added to the burning assemblage it is usually advisable to place the new log in a particular position for the most efficient burning thereof, said position frequently being at the rear or back portion of the fire area. The wood or logs are frequently quite heavy and awkward to handle and this, coupled with the manipulation of the logs in a "hot spot," creates a difficult situation. Present day log handling equipment in widespread use normally comprises tongs which may be utilized for retrieving a log from a source of supply and transporting the log to the site of use. These devices are usually inefficient for the placing of the log in the burning area, particularly in placing of the log in a position near the rear of the fire. Other tools, such as pointed elongated tools normally called pokers, are widely used for repositioning the logs in the burning area but very little real control of the log is afforded by these pokers.

Log handling devices have been developed to overcome these disadvantages, such as those shown in the Wood U.S. Pat. No. 867,630; Page U.S. Pat. No. 1,467,192; Parish U.S. Pat. No. 1,892,490 and the Hill U.S. Pat. No. 4,103,955. These devices also have certain disadvantages, however. As for example, the Hill log cinch is provided with a particularly designed elliptical body carrying gripping means and having a cut-away portion whereby the elliptical body may be moved over a log whereby the gripping means may be utilized for biting the log upon a forward pulling force being applied to the tool. This facilitates pulling or dragging of the log along the ground or the like but is of little assistance in maneuvering of a log into a usable position within a fireplace or the like. The Parish device is constructed for use in the logging industry and lifts and supports a log during the cutting or sawing thereof to avoid binding of the saw. The Wood patent shows a cant hook tool having spurs provided at one end of the tool for biting into the outer periphery of the log and having pivotal hook means for biting engagement with one end of the log in order to roll or carry timber. The center of balance of the log engaged by the Wood device renders the manipulation and the placement of the log in a fireplace or the like quite difficult. Page provides a cant hook having forwardly disposed prongs adapted to bite into the outer periphery of a log for cooperation with a pair of pivotal prong members also adapted to bite into the outer periphery of the log. The balance of the log so engaged may render manipulation thereof unwieldy and in addition release of the gripped log is difficult.

SUMMARY OF THE INVENTION

The present invention contemplates a novel log handling tool which is particularly designed and constructed for overcoming the foregoing disadvantages. The novel tool comprises a barrel having a reciprocal shaft disposed therein and ratchet and pawl means and latch means cooperating between the barrel and shaft for alternately extending and contracting the shaft with respect to the barrel and providing a retracting and latching action for the log handling tool. A first handle means is provided at one end of the barrel and a second handle means is longitudinally disposed on the barrel substantially centrally between the first handle means and the opposite end of the barrel to provide an efficient balancing of the tool while handling a log. Forwardly disposed prong or tine means is secured to the outer end of the shaft for encircling at least a portion of the outer circumference of an individual log and second prong means is secured to the barrel for encircling a diametrically opposed portion of the outer circumference of the log whereby the log may be efficiently gripped for maneuvering thereof. The forward prong means is preferably constructed from a suitable spring steel to provide a constant gripping pressure against the outer periphery of the engaged log thus not only facilitating picking up and transporting of the log but also facilitating the release of the log in the desired end position for use therefor. The retracting and latching assembly is selectively "timed" for coordinated action wherein the pawl is released before the disengagement of the latch to assure a smooth and efficient release of the log when desired. In addition, the angle or the point on the outer end of the forward tine and the prong means is important in that if the point is too small or too sharp it will bite into or bury itself in the wood and removal of the prong or tine from the log will be difficult. Alternately if the angle of the point is too great or the point is too blunt the prong or tine will not securely engage the log. The overall length of the forward tine is also important in that an excessively long tine will render the tool inefficient in handling of small diameter logs and an exceedingly short tine would be of a disadvantage in the handling of large diameter logs. The novel log handling tool or implement is simple and efficient in operation and economical and durable in construction.

DETAILED DESCRIPTION OF THE PREFERRED EMBODIMENTS

Figure 2:
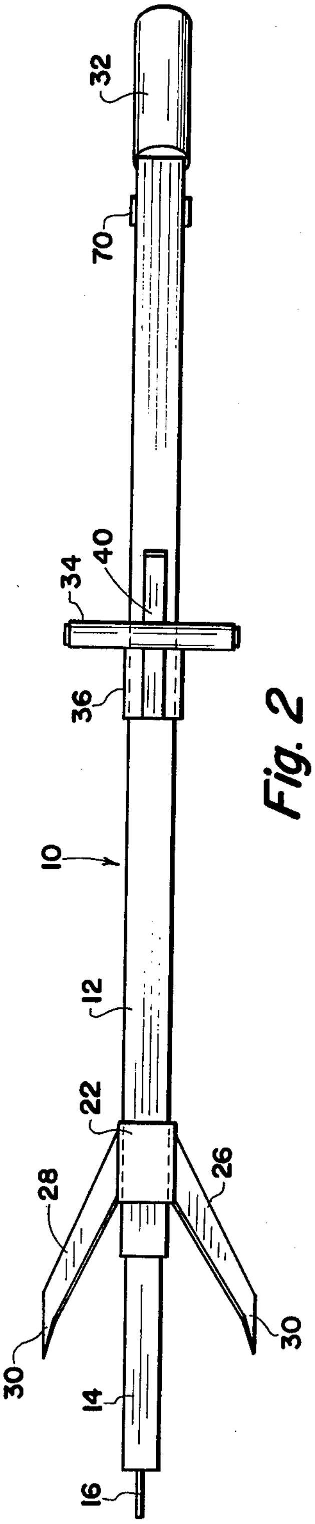
FIG. 2 is a plan view taken on line 2—2 of FIG. 1.

Referring to the drawings in detail and particularly FIGS. 1 through 12 reference character 10 generally indicates a log handling tool embodying the invention and comprising a barrel 12 preferably of a substantially square cross-sectional configuration, but not limited thereto, having a shaft 14 reciprocally disposed therein. It is preferable that the cross-sectional configuration of the shaft 14 be of a square configuration complimentary to the configuration of the inner periphery of the barrel 12 to substantially preclude relative rotation therebetween. A forward prong or tine member 16 is rigidly secured to the outer end of the shaft 14 in any well known manner (not shown). The tine 16 is preferably constructed from a spring steel material and is of an angular or generally arcuate configuration as particularly shown in FIGS. 1 and 3 for a purpose as will be hereinafter set forth. The outer end 18 of the tine 16 is of an angular configuration providing a point 20 at the end thereof. It is important that the angle of the point 20 be particularly selected in order to avoid too sharp a point and too blunt a point. In order to achieve the optimum configuration for the point 20 it has been found that the angle a is preferably 45° plus or minus 5°. In addition it is important that the overall length of the tine 16 be held within selected minimum and maximum dimension for optimum handling of a log of substantially any diameter.

A yoke member 22 is secured around the outer periphery of the barrel 12 in any suitable manner such as by a pair of spaced transversely extending studs 24, and is provided with a pair of oppositely disposed outwardly diverging prongs 26 and 28. The prongs 26 and 28 extend forwardly in a direction toward the tine 16 as particularly shown in FIGS. 1 and 3. The outer end of each prong 26 and 28 is provided with an angled portion 30 of substantially the same general configuration as the angled portion 18 of the tine 16. The angular orientation b of the prongs 26 and 28 is preferably 45° plus or minus 5° in the direction toward the tine 16 all for a purpose as will be hereinafter set forth.

Figure 1:
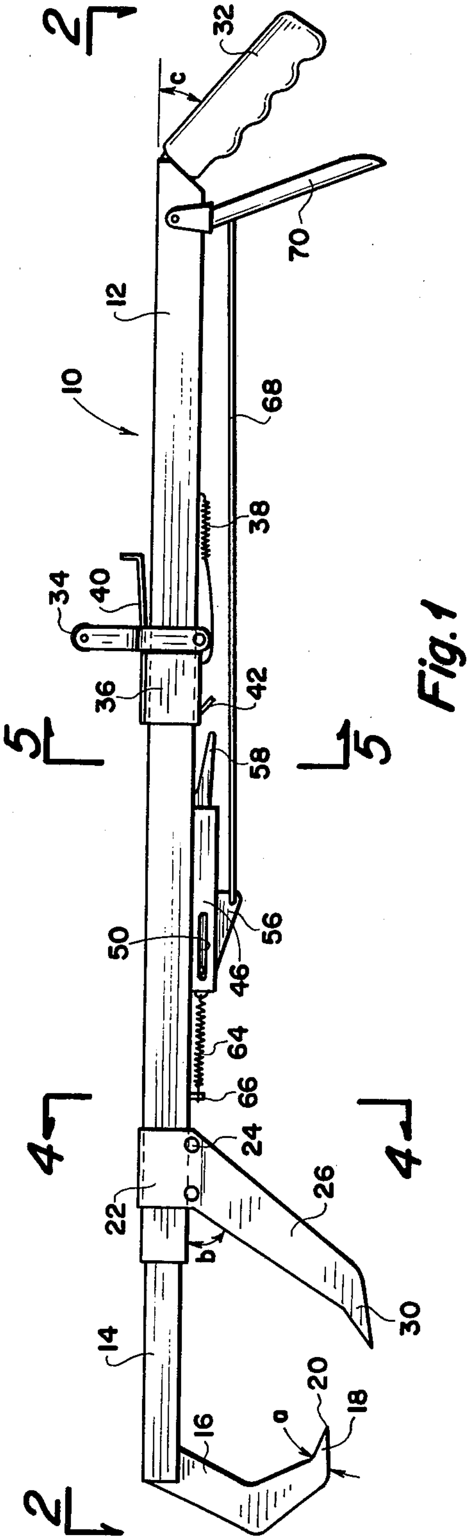
FIG. 1 is a side elevational view of a log handling tool embodying the invention.

A suitable handle member 32 is provided at the right hand end of the barrel 12 as viewed in FIGS. 1 and 2 for facilitating manipulation of the tool 10 during a log handling operation. It is preferable that the angle c of the handle 32 be 45° plus or minus 5° in order to provide a proper balance for the tool 10 as will be hereinafter set forth. A second handle means 34 is secured to the outer periphery of the barrel 12 in spaced relation between the yoke 22 and the handle 32. The handle 34 may be of any suitable configuration and is preferably transversely disposed with respect to the longitudinal axis of the barrel 12 for cooperation with the handle 32 to provide the proper balance for manipulation of substantially any log engaged by the tool 10.

A sleeve member 36 is slidably disposed around the outer periphery of the barrel 12 and interposed between the yoke 22 and the handle 34 in such a manner that the handle 34 limits the slidable movement of the sleeve 36 in the direction toward the handle 32. A suitable helical spring means 38 is anchored between the outer periphery of the barrel 12 and the sleeve 36 for constantly urging the sleeve in a position against the handle 34 as particularly shown in FIGS. 1 and 2.

A lever member 40 is secured to the sleeve 36 and extends outwardly therefrom in a direction essentially parallel to the longitudinal axis of the barrel 12 and facilitates sliding of the sleeve 36 along the outer periphery of the barrel as will hereinafter set forth in detail. An outwardly extending release lug 42 is secured to the sleeve 36 or integral therewith as desired.

An elongated opening or slot 44 (FIG. 7) is provided in the barrel 12 interposed between the yoke 22 and the sleeve 36. A pair of spaced longitudinally extending brackets 46 and 48 are secured to the outer periphery of the barrel 12 on opposite sides of a slot or recess 44. A pair of aligned longitudinally extending recesses 50 and 52 are provided in the flanges 46 and 48 respectively for slidably receiving pin means 54 therethrough in order to pivotally and slidably secure a latch means 56 between the flanges 46 and 48. A pair of substantially identical L-shaped pawl members 58 and 60 are pivotally secured between the bracket flanges 46 and 48 in any suitable manner such as by a pivot pin 62. The pawl members 58 and 60 are disposed between the latch member 56 and the sleeve 36 as particularly shown in FIGS. 6 and 7. A suitable helical spring means 64 is anchored between the latch 56 and an outwardly extending post 66 (FIG. 1) provided on the outer periphery of the barrel 12. The spring means 64 constantly urges the latch means 56 in a left hand direction with respect to the slots 50 and 52 as viewed in the drawings. A connecting rod member 68 is operably connected between the latch means 56 and a trigger release lever 70 which is pivotally secured to the barrel 12 in any suitable or well known manner and preferably disposed in the proximity of the handle 32 for facilitating actuation thereof as will be hereinafter set forth.

Figure 6:
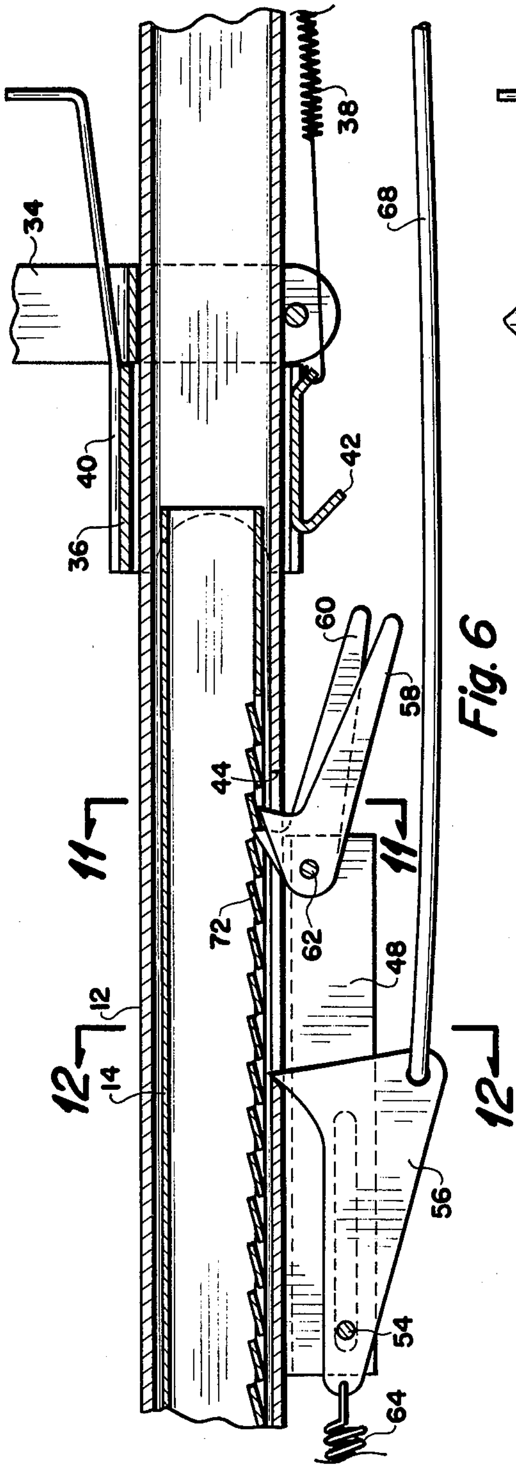
FIG. 6 is an enlarged broken sectional elevational view of a portion of the barrel and shaft of a log handling tool embodying the invention and illustrating one position of the latch and releasing means cooperating therebetween.
Figure 7:
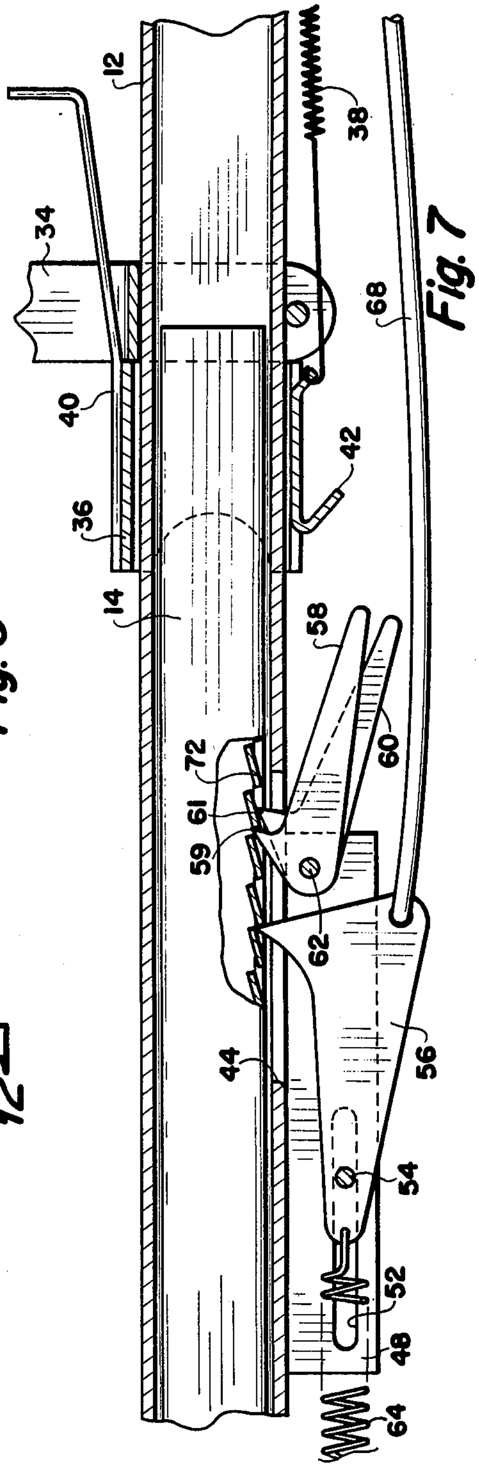
FIG. 7 is a view similar to FIG. 6 illustrating another position of the latching and releasing means.
Figure 8:
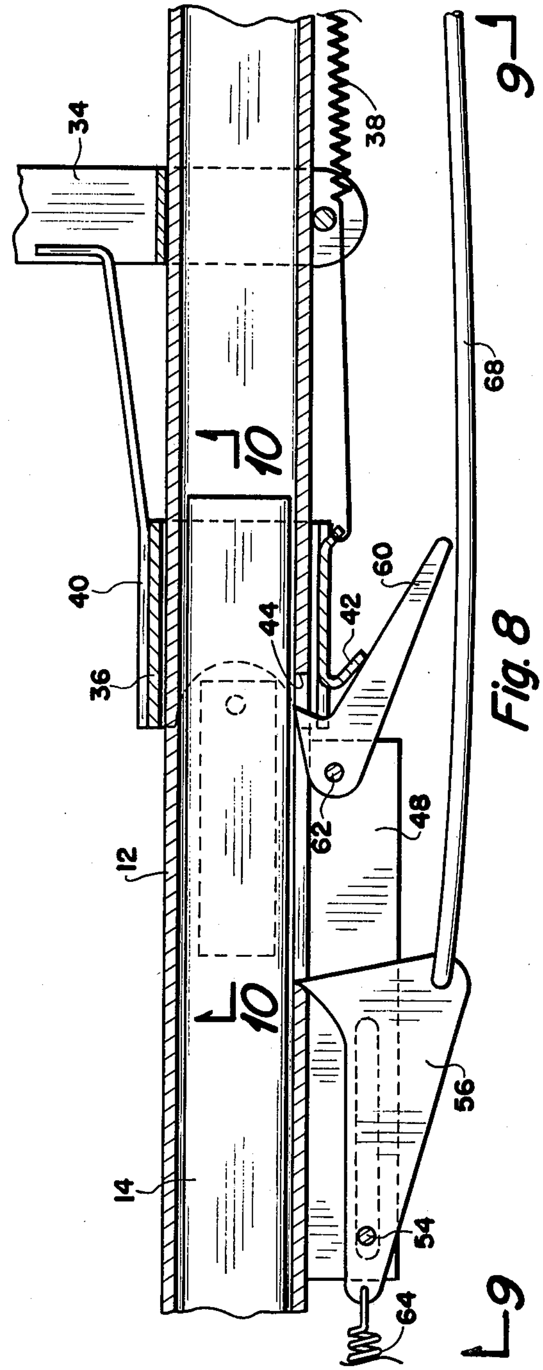
FIG. 8 is a view similar to FIGS. 6 and 7 showing still another position for the latching and releasing means.
Figure 9:
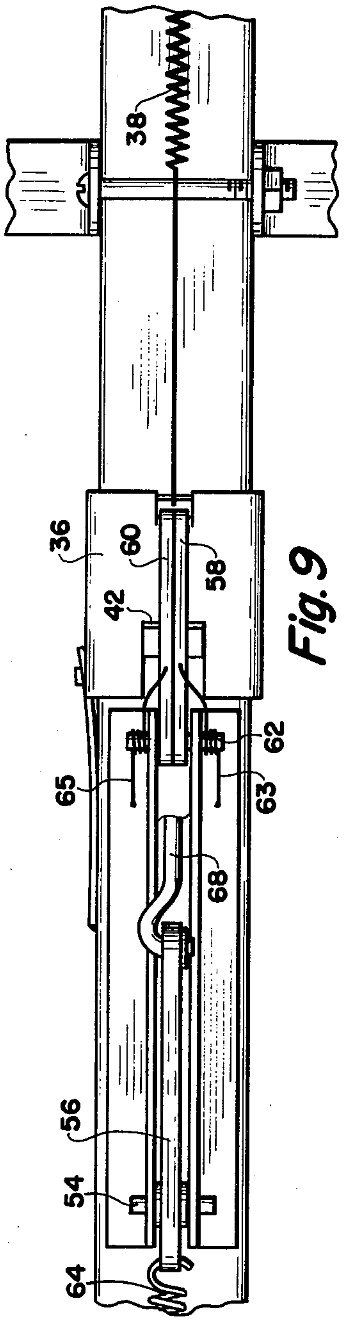
FIG. 9 is a view taken on line 9—9 of FIG. 8.

A plurality of longitudinally spaced louvers or teeth members 72 are provided on the shaft 14 to provide a ratchet for the tool 10 and preferably extend along and beyond the slot or opening 44 as will be particularly seen in FIGS. 6 and 7. The pawls 58 and 60 and latch member 56 selectively engage the ratchet or teeth member 72 during operation of the tool as will be hereinafter set forth. Whereas the pawls 58 and 60 are preferably of a substantially identical configuration they are purposely misaligned on the shaft 62 whereby the inner ends 61 and 59 thereof, respectively, are disposed in an offset relationship. This provides a controlled relatively small increment of movement between the shaft 14 and barrel 12 during operation of the tool 10. In addition it is to be noted that the pawls 58 and 60 are spring urged by suitable helical spring means 63 and 65, respectively, as shown in FIG. 9 whereby the pawls are constantly urged in a direction toward the ratchet 72. It is further to be noted that the spring 64 which constantly urges the latch member 56 in a forwardly direction as viewed in the drawing maintains the latch 56 in a normal position out of engagement with the ratchet 72 as particularly shown in FIG. 6.

It may be desirable to provide stop means cooperating between the barrel 12 and the shaft 14 for precluding a complete or accidental withdrawal of the shaft from the barrel. In order to provide such a stop means a yieldable strap member 74 (FIG. 10) may be secured to the outer periphery of the barrel 12 in any suitable manner (not shown) and in the proximity of an aperture 76 provided in the sidewall of the barrel. A stud member 78 is carried by the strap member 74 and is in substantial axial alignment with the bore 76 and slidably engagable therewith. A vent or opening 80 is provided in the sidewall of the shaft 14 to provide a stop or shoulder member 82 therein. The spring strap member 74 constantly urges the stud member 78 in a direction toward the outer periphery of the shaft 14 and when the aperture 80 moves into alignment with the stud 78 the stud 78 enters the opening 80 for engagement by the shoulder 82 to limit any further longitudinal movement of the shaft 14 in an extended position with respect to the barrel 12. Of course, in the event the strap member 74 is disposed in the proximity of the sleeve 36 it may be desirable to provide a recess or relief groove 84 in the sleeve 36 to provide clearance for the end of the strap 74 and stud 76 as the sleeve 36 is moved forwardly or in a direction toward the prongs 26 and 28 along the outer periphery of the barrel 12.

In the normal stowage or non-use position for the tool 10 the shaft 14 is normally maintained in a completely contracted position within the barrel 12. This places the forward tine 16 in relatively close proximity to the prongs 26 and 28. In this position at least one of the pawls 58 and 60 is in engagement with one of the teeth 72 of the ratchet. This securely locks the shaft 14 within the barrel 12. In this locked position the latch 56 is normally retained in a forward position by the spring 64 and is not in engagement with the ratchet 72, as is shown in FIG. 6.

Figures 3, 10, 11:
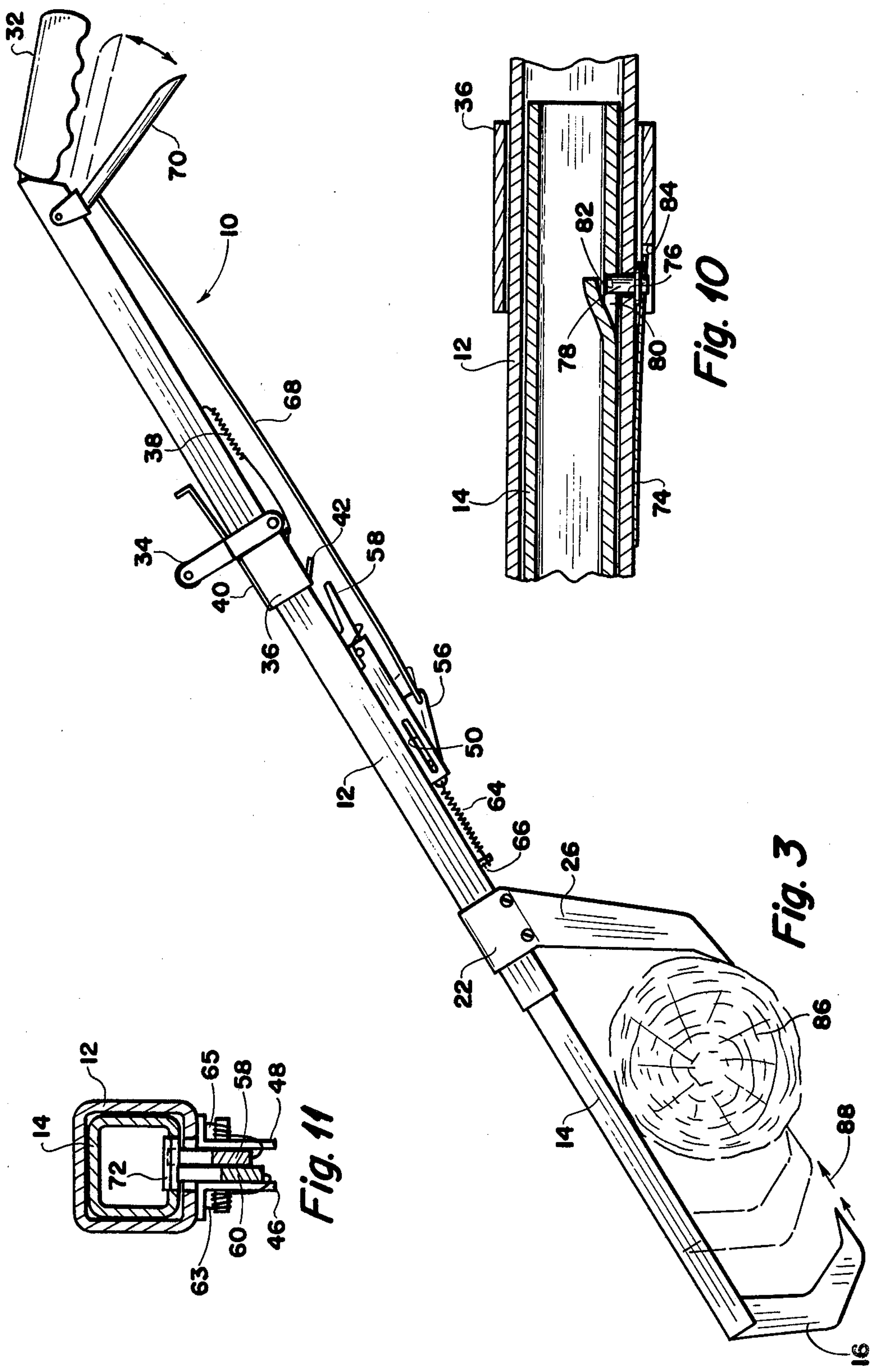
FIG. 3 is a side elevational view of a log handling tool embodying the invention and showing a log engaged thereby with one position of a latching means and forward tine being shown in solid lines and an alternate position therefor shown in broken lines for purposes of illustration.
FIG. 10 is a view taken on line 10—10 of FIG. 8.
FIG. 11 is a view taken on line 11—11 of FIG. 6.
Figure 4:
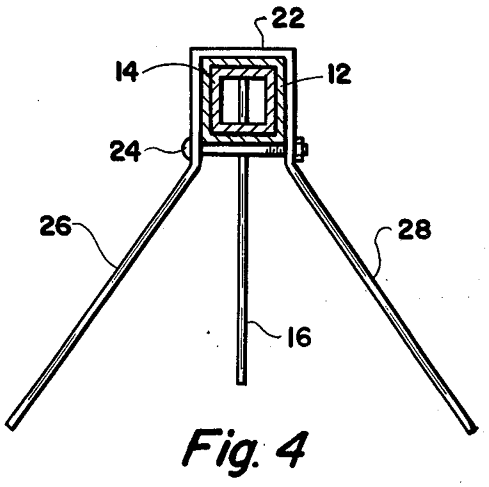
FIG. 4 is a view taken on line 4—4 of FIG. 1.
Figure 12:
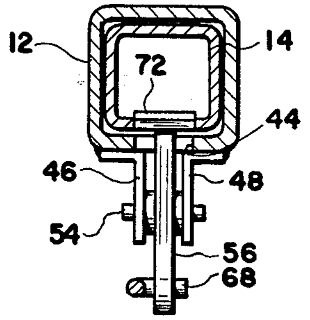
FIG. 12 is a view taken on line 12—12 of FIG. 6.
Figure 5:
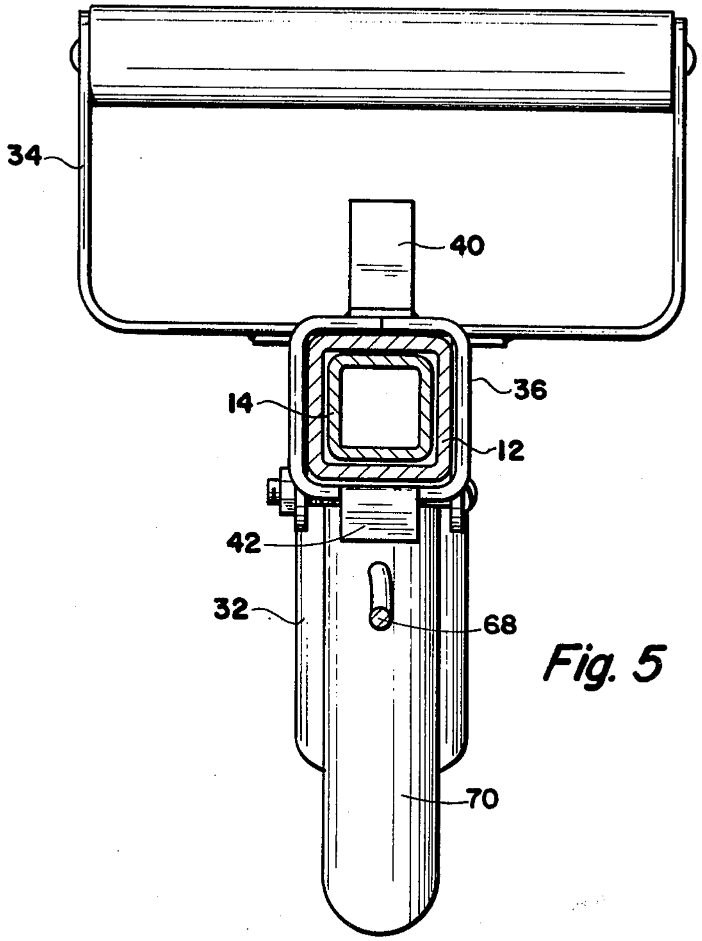
FIG. 5 is a view taken on line 5—5 of FIG. 1.

When the tool 10 is to be utilized for maneuvering the log 86 as shown in FIG. 3 the sleeve 36 may be manually moved along the outer periphery of the barrel 12 in a direction toward the pawls 58 and 60. This moves the release member 42 into engagement with the pawls for pivoting thereof about the shaft 62 and against the force of the springs 63 and 65 to release the engagement between the pawls and the ratchet 72. The shaft 14 may then be freely extended to a position providing sufficient clearance between the forward tine 16 and the prongs 26 and 28 for receiving the log 86 therebetween. It is normally preferable to move the tine 16 forwardly a greater distance than is required for engaging the log in order to facilitate positioning of the log between the tine 16 and prongs 26 and 28. In order to move the tine 16 in a direction shown by the arrow 88 in FIG. 3 and into engagement with the log 86 the trigger 70 may be manually moved in the direction toward the handle 32. This moves the latch 56 rearwardly or against the force of the spring 64 and pivots the latch about the shaft 54 for moving the latch into engagement with one of the teeth of the ratchet 72 as shown in FIG. 7.

Of course, return of the sleeve 36 to its normal resting position against the handle 34 releases the engagement between the release member 42 and the pawls 58 and 60 whereupon the pawls are returned to engagement with the ratchet 72. When the pressure against the trigger member 70 is released the latch returns to its out of engagement position with respect to the ratchet but the pawls 58 and/or 60 prevent any retrograde movement of the shaft 14 by virtue of the engagement of the pawl with the ratchet 72. As the latch 56 is once again engaged with the ratchet 72 and is moved in a rearward direction the shaft 14 is moved rearwardly and the pawls ride along the outer surface of the ratchet 72 for engagement with the next succeeding tooth thereof all as is well known. This action may be repeated until the tine 16 is brought into the proper engagement with the outer periphery of the log 86 for cooperating with the prongs 26 and 28 to securely grip the log therebetween.

With the log 86 securely positioned between the tine 16 and the prongs 26 and 28 the entire tool 10 and log may be easily manipulated by manually grasping one or both the handles 32 and 34. The balance of the tool is such that carrying of the log is very easy and placing of the log at substantially any desired ultimate position for use may be efficiently achieved. In order to release the log it is usually important that the pawls 58 and/or 60 be released from engagement with the ratchet 72 prior to release of the latch 56 therefrom. The shaft 14 may be extended from the barrel 12 in the manner as hereinbefore set forth for freeing the log from the tool 10.

Referring now to FIGS. 13 through 18 a modified log handling tool 88 is shown comprising a barrel 90 generally similar to the barrel 12 and a shaft 92 similar to the shaft 14 slidably disposed within the barrel 90. A spring steel forward tine member 94 is secured to the outer end of the shaft 92 in any suitable manner and for the same purpose as the tine 16. A handle member 96 corresponding to the handle member 32 is suitably secured to the outer end of the barrel 90 and is preferably disposed at an angle of substantially 45° with respect to the longitudinal axis of the barrel as hereinbefore set forth in connection with the tool 10.

Whereas the handle 96 may be of any suitable or desired construction it may be preferable to provide a central core member 98 (FIG. 15) welded or otherwise suitably secured to the outer end of the barrel 90 for receiving a yieldable or flexible grip member 100 thereover. It also may be preferable to secure a nut member 102 to the inner end of the tine 94, said nut member having an outer periphery of a configuration corresponding to the inner periphery of the shaft 92 for securement therein.

A pair of substantially identical oppositely disposed V-shaped prong members 104 and 106 are secured to the outer periphery of the barrel 90 in any suitable manner such as by complimentary bolts 108 and lock nuts 110. The prongs 104 and 106 extend angularly outwardly and forwardly in a direction toward the tine 94 as will be particularly apparent in FIGS. 13 and 14. As hereinbefore set forth it is important that the points of the tine 94 and prongs 104 and 106 be sufficiently sharp as to secure the log 86 therebetween and yet sufficiently blunt so as not to embed within the log to a depth making release of the log difficult. In addition it is important that the forward tine 94 be constructed of a suitable spring steel in order to provide a constant gripping pressure against the log 86 when the log is being maneuvered by the tool 10 or 88.

Figure 15:
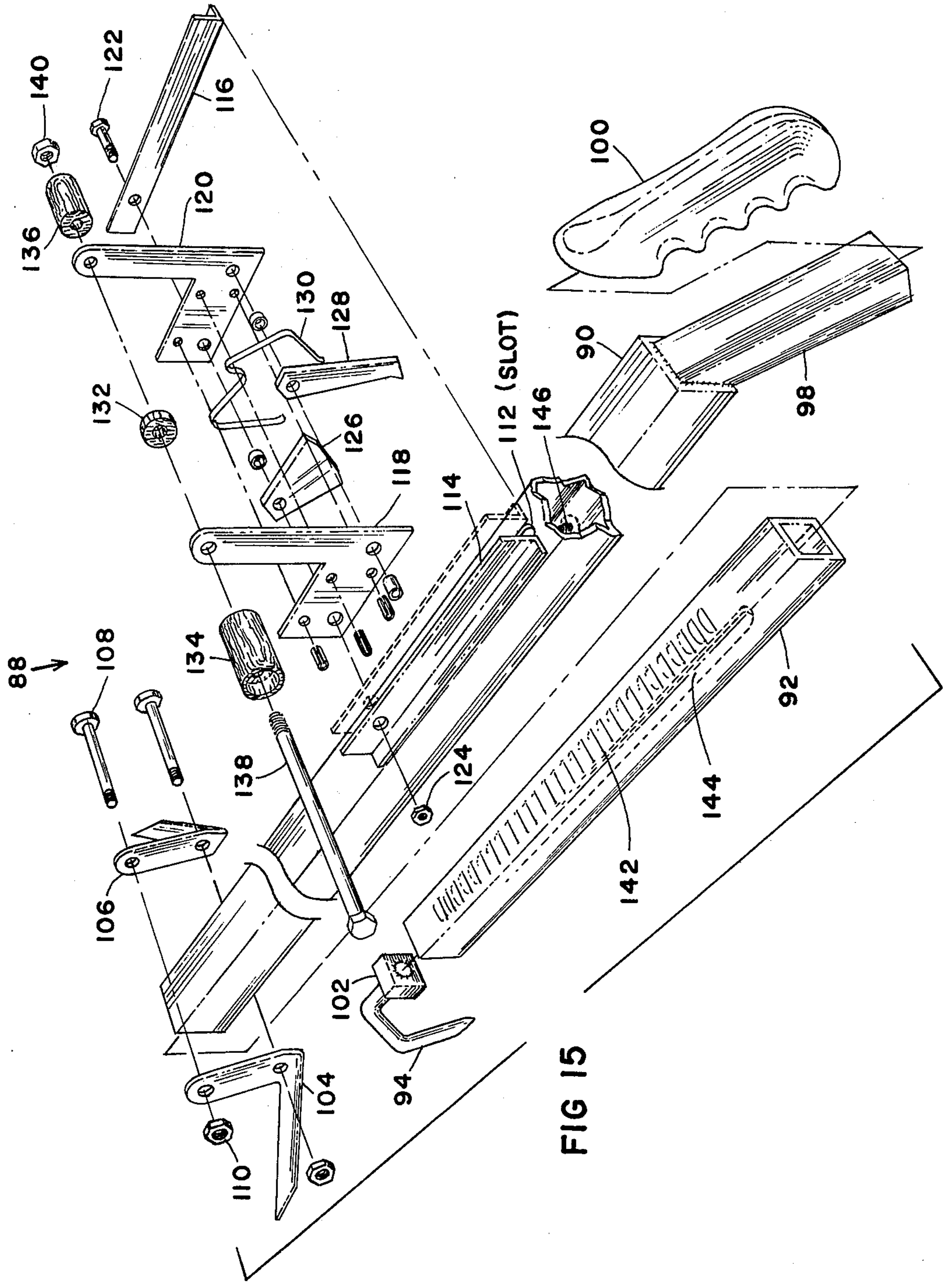
FIG. 15 is an exploded perspective view of the tool shown in FIGS. 13 and 14.
Figure 18:
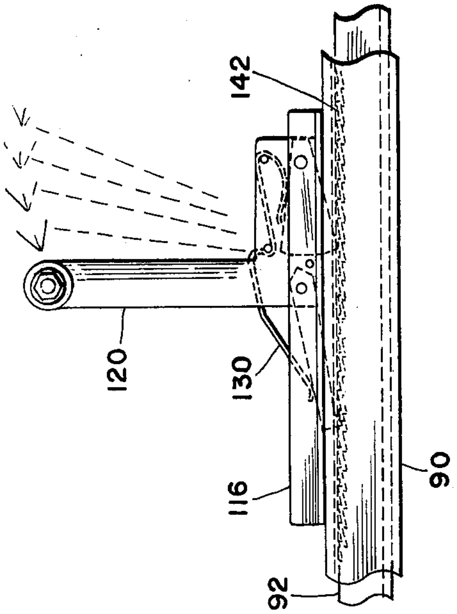
FIG. 18 is a view similar to FIG. 17 showing a reverse operational mode of the latching and releasing means.
Figure 17:
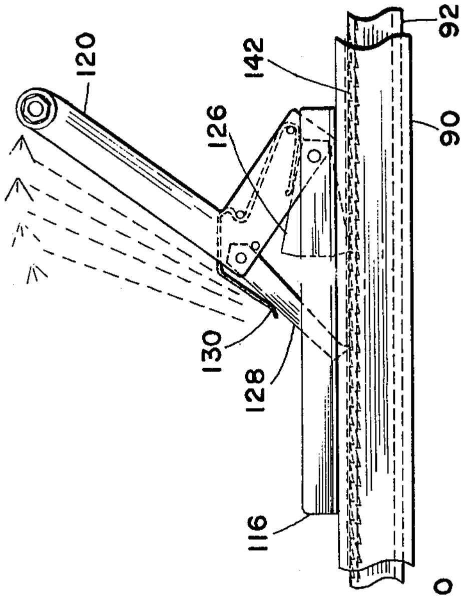
FIG. 17 is a broken side elevational view of the latching and releasing means of the tool shown in FIGS. 13 and 14 with one position thereof being shown in solid lines and one operational sequence mode shown in broken lines.
Figure 16:
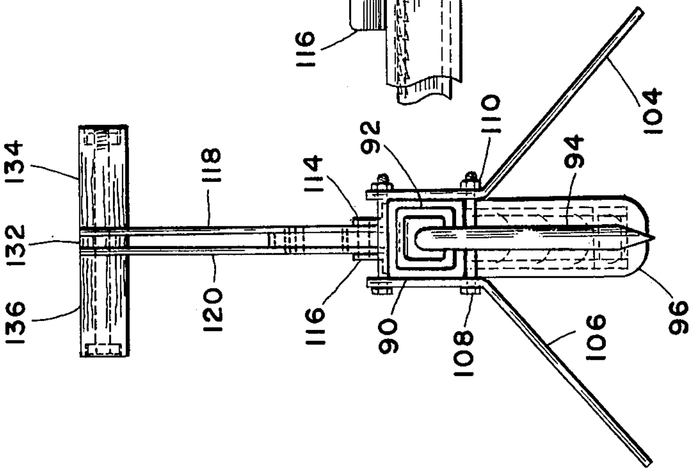
FIG. 16 is a view taken on line 16—16 of FIG. 14.

An elongated slot or aperture 112 is provided in the side wall of the barrel 90 as particularly shown in FIG. 15 and a pair of substantially identicial oppositely disposed angle brackets 114 and 116 are welded or otherwise suitably secured to the outer periphery of the barrel 90 along the opposite sides of the slot 112. A pair of substantially L-shaped pivot arms 118 and 120 are disposed against the inboard surfaces of the brackets or flanges 114 and 116, respectively, and each pivot arm 118 and 120 has one corner thereof pivotally secured to the respective flange 114 and 116 in any suitable manner such as by a stud 122 and cooperating lock nut 124. A pawl member 126 is pivotally secured between the pivot arms 118 and 120 in any suitable manner and is arranged in substantial alignment with the slot 112. A latch member 128 is also pivotally secured between the pivot arms 118 and 120 in spaced relation with respect to the pawl 126 and is also in substantial alignment with the slot 112. The pawl 126 and latch 128 are both urged in directions toward the slot 112 by means of a suitable spring means 130 for a purpose and in a manner as will be hereinafter set forth. An annular spacer 132 is interposed between the outer ends of pivot arms 118 and 120 and a pair of oppositely disposed outwardly extending sleeves 134 and 136 are secured to the outboard faces of the pivot arms 118 and 120, respectively, and may be secured in assembled relation with respect thereto in any suitable manner such as by a bolt 138 and complimentary lock nut 140, thus providing a second handle means for the tool 88.

A longitudinally extending ratchet means 142 is provided along one side wall of the shaft 92 and an elongated slot or opening 144 (shown in broken lines in FIG. 15) is provided in a second side wall of the shaft 92. A stop means such as a screw 146 extends through a side wall of the barrel 90 and into and through the slot 144 and cooperates with at least one end of the slot for limiting reciprocal movement of the shaft 92 with respect to the barrel in at least one direction, thus substantially precluding an accidental withdrawal of the shaft from the barrel.

Figures 13, 14:
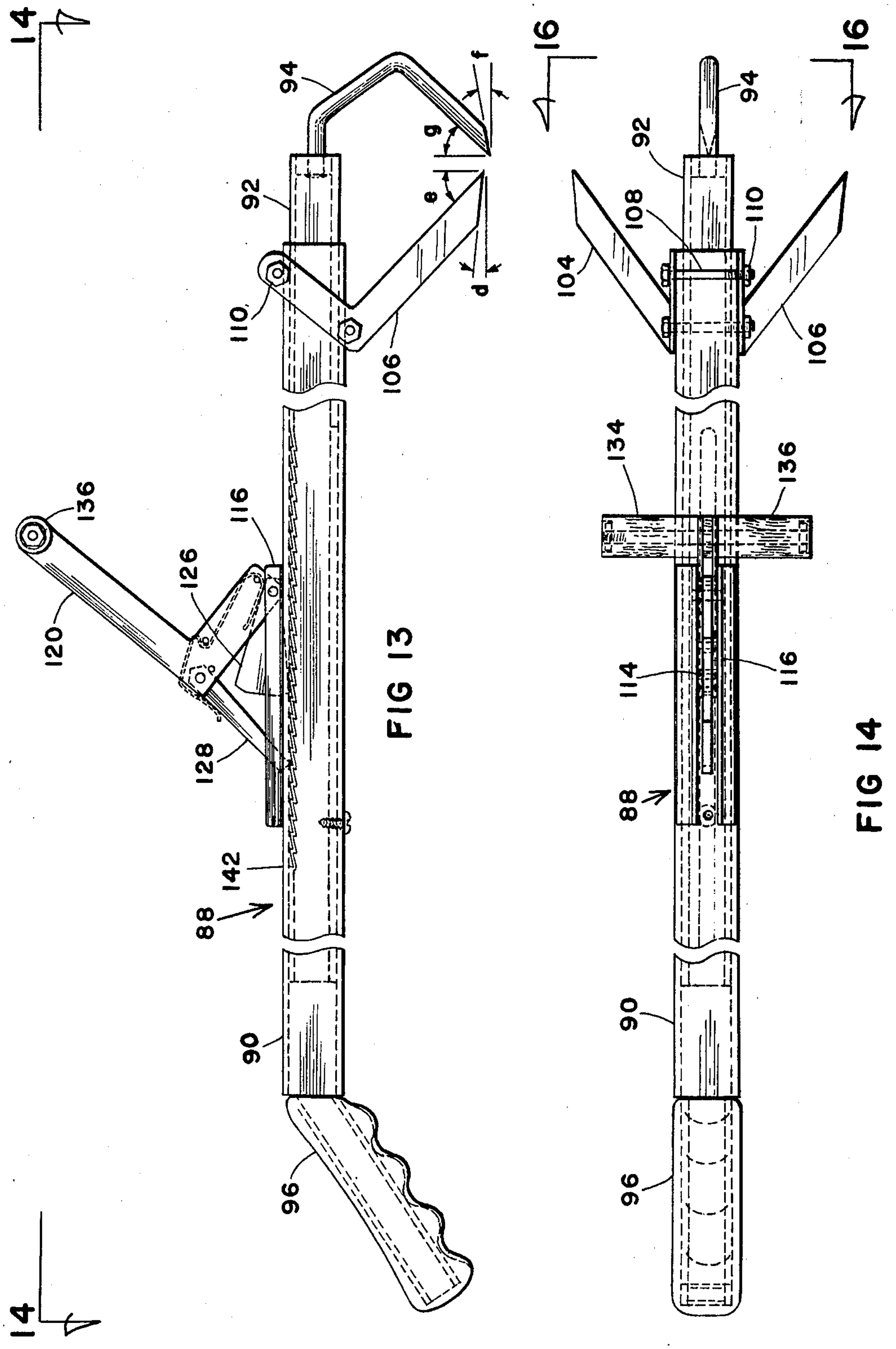
FIG. 13 is a side elevational view of a modified log handling tool embodying the invention with portions shown in broken lines for purposes of illustration.
FIG. 14 is a view taken on line 14—14 of FIG. 13.

In the normal storage or non-use position of the tool 88 it is usually preferable to position the shaft 92 essentially completely collapsed within the barrel 90 as generally indicated in FIGS. 13 and 14. The pawl 126 and latch 128 are both urged in direction toward the ratchet means 142 by the spring means 130 as will be particularly apparent in FIG. 13. The engagement of the pawl 126 with the ratchet means 142 holds the shaft 92 against any longitudinal outward movement with respect to the barrel 90. In order to release the engagement of the pawl 126 with the ratchet means 142 the pivotal brackets 118 and 120 may be manually pivoted in a clockwise direction as viewed in FIG. 13 whereby the pawl 126 and latch member 128 will be moved or released from the spring urged engagement with the ratchet. The shaft 92 will then be free to move longitudinally outwardly with respect to the barrel 90 and of course gravity may be utilized for this action if desired.

When the barrel 92 has moved longitudinally outwardly through a sufficient distance for spacing the tine 94 with respect to the prongs 104 and 106 for receiving the log 86 therebetween the pivotal arms 118 and 120 may be replaced to the normal position therefore, said arms being also spring urged by the spring means 130, for reengaging the pawl 126 with the ratchet 142, thus limiting any further outward movement of the barrel 92. In order to move the tine 94 inwardly for engaging the outward periphery of the log 86 the pivotal arm members 118 and 120 may be pivoted in the manner hereinbefore set forth whereby the pawl 126 rides upwardly over the outer surface of the ratchet 142 and the latch member 128 engages successively the ratchets 142 for incremental movement inwardly of the barrel 92 as is well known.

It will be readily apparent that the angular disposition of the engaging end of the latch means 128 as well as of the pawl 126 is particularly selected for engaging the ratchet teeth in a manner providing for an efficient actuation of the shaft 92 in both the inward and outward movement thereof with respect to the barrel 92. For example, the engaging end of the latch member 128 preferably engages the "Vee" of each tooth and essentially pivots about the point of engagement whereas the pawl engages one side of the ratchet tooth. The handle 96 and handle members 134 and 136 may be utilized in the manner as hereinbefore set forth for maneuvering the tool 88 and engaged log 86.

The angular configuration of the outer tips or points of both the prongs 104 and 106 and tine 94 is also important with regard to the penetration thereof into the log. As particularly shown in FIG. 13, the angle d is preferably 10°, plus or minus 3°, and the angle e is preferably 45°, plus or minus 3°. Similarly, the angle f is preferably 10°, plus or minus 3°, and the angle g is preferably 45°, plus or minus 3°. As the pressure of the front tine 94 is increased, the penetration angle is increased, lessening the possibility of the tine sticking in the log and simultaneously increasing the ability of the tine to release the log. The holding ability is thus increased at the prongs 104 and 106. The tine 94 is sufficiently strong as to prevent the angle from becoming so great from the normal pressure applied by the operator of the tool 10 as to interfere with the release of the log.

From the foregoing it will be apparent that the present invention provides a novel log handling tool wherein a log may be efficiently grasped around the circumference thereof for retrieval from a supply or the like and easily maneuvered for selective positioning at the position of desired end use for the log. The balance of the log engaged in the tool is such that maneuvering of the log is easy and efficient in spite of the weight of the log. The log may be easily gripped by the tool and may be efficiently released by the tool with a minimum of effort.

Whereas the present invention has been described in particular relation to the drawings attached hereto, it should be understood that other and further modifications apart from those shown or suggested herein may be made within the spirit and scope of this invention.

What is claimed is:

1. A log handling tool comprising barrel means, shaft means reciprocally disposed within said barrel means, tine means secured to the outer end of the shaft means, prong means secured to the barrel means for cooperation with the tine means to retrieve and carry and release a log, pawl means and ratchet means cooperating between the shaft means and barrel means for securing the shaft means in selected longitudinal position with respect to the barrel means, latch means cooperating with the pawl means and ratchet means for providing movement of the shaft means in at least one longitudinal direction with respect to the barrel means, and handle means provided on said barrel means for facilitating handling of the log engaged by the tine means and prong means, spring means operably secured to the pawl means for constantly urging the pawl means in a direction toward the ratchet means, said latch means being spring urged in a direction toward the ratchet means, trigger means operably connected with the latch means for selective actuation thereof, and wherein the handle means comprises a first handle member secured to one end of the barrel means, and a second handle means secured to the barrel means substantially centrally between the opposite ends thereof for providing an efficient balance of the tool when a log is engaged by the tine means and prong means.

2. A log handling tool as set forth in claim 1 wherein the second handle means is operably connected to the pawl means and ratchet means for actuation thereof.

3. A log handling tool as set forth in claim 1 wherein the tine means is constructed of spring steel for providing a constant gripping pressure against an engaged log.

4. A log handling tool as set forth in claim 1 wherein the handle means comprises at least one handle member secured to the barrel means and extending at an angle of approximately 45° with respect to the longitudinal axis of the barrel means.

5. A log handling tool as set forth in claim 1 and including stop means cooperating between the barrel means and shaft means for limiting the movement of the shaft means in at least one longitudinal direction for precluding accidental disengagement of the shaft means with respect to the barrel means.

6. A log handling tool as set forth in claim 1 wherein the outer ends of the tine means and prong means are sufficiently pointed for effectively engaging the outer periphery of the log and sufficiently blunt to limit penetration of the log for facilitating the release of the log from the tool.

7. A log handling tool as set forth in claim 1 and including release means provided for the latch means and pawl means whereby the pawl means may be released prior to release of the latch means.

* * * * *